US011985481B2

(12) United States Patent
Lai et al.

(10) Patent No.: US 11,985,481 B2
(45) Date of Patent: May 14, 2024

(54) HEARING COMPENSATION DEVICE AND HEARING COMPENSATION METHOD

(71) Applicant: GMI Technology Inc., Taipei (TW)

(72) Inventors: Ying-Hui Lai, Taipei (TW); Ming-Han Yeh, Taipei (TW)

(73) Assignee: REHEAR AUDIOLOGY COMPANY LTD., Taipei (TW)

( * ) Notice: Subject to any disclaimer, the term of this patent is extended or adjusted under 35 U.S.C. 154(b) by 91 days.

(21) Appl. No.: 17/825,599

(22) Filed: May 26, 2022

(65) Prior Publication Data

US 2023/0319489 A1 Oct. 5, 2023

Related U.S. Application Data

(60) Provisional application No. 63/326,503, filed on Apr. 1, 2022.

(30) Foreign Application Priority Data

Apr. 18, 2022 (TW) ................................ 111114679

(51) Int. Cl.
*H04R 25/00* (2006.01)

(52) U.S. Cl.
CPC ......... *H04R 25/505* (2013.01); *H04R 25/554* (2013.01)

(58) Field of Classification Search
None
See application file for complete search history.

(56) References Cited

U.S. PATENT DOCUMENTS

| | | | | |
|---|---|---|---|---|
| 2011/0038496 | A1 | 2/2011 | Lott et al. | |
| 2014/0378191 | A1 | 12/2014 | Hosoi et al. | |
| 2019/0320268 | A1* | 10/2019 | Blau | A61B 5/123 |

FOREIGN PATENT DOCUMENTS

| | | | |
|---|---|---|---|
| CN | 110035141 | A | 7/2019 |
| TW | 201206205 | A1 | 2/2012 |
| TW | M635174 | U | 12/2022 |

OTHER PUBLICATIONS

Office Action dated Dec. 21, 2022 from the Intellectual Property Office of Taiwan in TW Application No. 111114679.

* cited by examiner

*Primary Examiner* — Harry S Hong
(74) *Attorney, Agent, or Firm* — Sughrue Mion, PLLC

(57) ABSTRACT

A hearing compensation device is provided and includes a transducer, which receives sound to convert the sound into electrical signals; and a noise reduction module and a hearing compensation module, which are connected to the transducer to receive the electrical signals synchronously. The noise reduction module generates opposite signals with the same energy as the electrical signals to remove ambient noise. The hearing compensation module obtains a real-time customized audiogram or a hearing table according to a user's current real environment. Multiple sets of parameters of multiple filters are searched via active noise cancellation technology with optimization method and loss function to generate an optimal filter parameter value, such that the noise reduction module and the hearing compensation module disposed in the same chip perform real-time and/or synchronous processing to provide a hearing aid with reduced signal delay, real-time and user customization. A hearing compensation method is also provided.

11 Claims, 7 Drawing Sheets

HEARING COMPENSATION DEVICE AND HEARING COMPENSATION METHOD

BACKGROUND

1. Technical Field

The present disclosure relates to a hearing compensation technology, in particular, to a hearing compensation device and a hearing compensation method with noise reduction.

2. Description of Related Art

According to statistics, there are more than 120,000 people with hearing impairments in Taiwan who have certified physical and mental disabilities. Hearing problems will lead to invisible or significant barriers to language communication, occupational adaptation, social participation, school learning, life safety and other important aspects of life.

In addition, Taiwan is about to enter a super-aged society, and hearing loss ranks among the top three chronic diseases among the elderly. However, due to the advancement of modern hearing aids and hearing aid technology, the negative impact and burden of hearing impairment on individuals, families, communities, and even society as a whole can be greatly improved.

However, conventional hearing aids or auditory aids require a physician's diagnosis of a case with hearing loss that affects daily communication and referral to a hearing professional (e.g., an audiologist). Hearing professionals will first understand the difficulties, limitations and needs of hearing loss on the individual's life, so as to provide hearing loss related consultation on hearing aids and hearing, and hearing testing must be performed in the audiometric testing room. According to the hearing test results of the hearing-impaired patients, the hearing aid audition is carried out, and the reaction of the hearing-impaired patients after the hearing aid is observed and tested, and finally the hearing aid suitable for the hearing-impaired patients is completed. However, since the hearing test is performed in the audiometric testing room, the situation of the hearing-impaired patient in the actual encounter environment cannot be presented, and the auxiliary effect is poor. If the auxiliary effect needs to be corrected, it needs to be performed again in the audiometric testing room, which is less efficient and less immediate.

Therefore, how to provide a hearing compensation device and a hearing compensation method that do not need to be limited to an audiometric testing room for performing audiometry and do not require the assistance of a hearing professional have become an urgent issue for the industry to solve. Additionally, the hearing compensation device and the hearing compensation method can effectively provide real-time and customized hearing devices (such as hearing aids, auditory aids or earphones and glasses with hearing aid functions) for users (especially hearing-impaired patients) in the current real environment of a non-audiometric testing room.

SUMMARY

In order to solve the above-mentioned conventional technical problems or provide related effects, the present disclosure provides a hearing compensation device, including: a transducer configured to receive sound to convert the sound into electrical signals; and a noise reduction module and a hearing compensation module connected to the transducer to receive the electrical signals synchronously, wherein the noise reduction module generates opposite signals with a same energy as the electrical signals to remove ambient noise, wherein the hearing compensation module obtains a real-time customized audiogram or a hearing table according to a user's current real environment, and multiple sets of parameters of multiple filters are automatically searched via noise cancellation technology combined with optimization method and loss function to generate an optimal filter parameter value, such that the noise reduction module and the hearing compensation module disposed in a same or single chip perform real-time and/or synchronous processing.

The present disclosure also provides a hearing compensation method, including receiving sound by a transducer to convert the sound into electrical signals; and receiving the electrical signals by a noise reduction module and a hearing compensation module connected to the transducer, wherein the noise reduction module generates opposite signals with a same energy as the electrical signals to remove ambient noise, wherein the hearing compensation module obtains a real-time customized audiogram or a hearing table according to a user's current real environment, and multiple sets of parameters of multiple filters are automatically searched via noise cancellation technology combined with optimization method and loss function to generate an optimal filter parameter value, such that the noise reduction module and the hearing compensation module disposed in a same or single chip perform real-time and/or synchronous processing.

In one embodiment, the hearing compensation device and the hearing compensation method perform audiometry in a non-audiometric testing room environment.

In one embodiment, the hearing compensation device is disposed in a hearing aid, and the hearing compensation method is applied to the hearing aid. In another embodiment, the hearing aid is free from being a hearing room dedicated earphone in an audiometric testing room.

In one embodiment, the hearing compensation device and the hearing compensation method perform real-time and/or synchronous processing through an application program (app) of a smart phone combined with a wireless communication technology.

In one embodiment, the noise reduction module is an active noise cancellation module, and the noise cancellation technology is an active noise cancellation technology.

DETAILED DESCRIPTION

Figure 1:
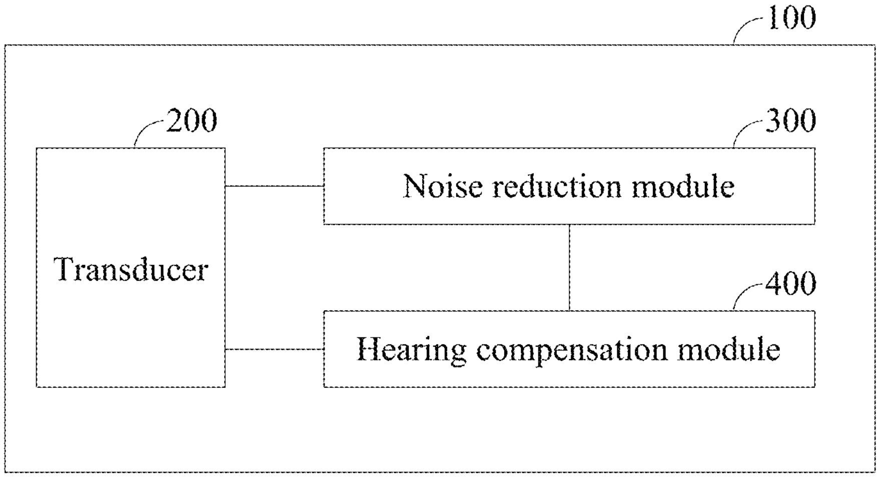
FIG. 1 is a schematic block diagram showing a hearing compensation device according to the present disclosure.

The embodiments of the present disclosure are described below, and those skilled in the art can easily understand other advantages and effects of the present disclosure from the contents disclosed in this specification.

It should be noted that the structures, proportions, sizes, etc. shown in the drawings in this specification are used to cooperate with the contents disclosure in this specification for understand and reading of those skilled in the art, and are not intended to limit the conditions for the implementation of the present disclosure. Therefore, it does not have technical significance. Any modification of structure, change of proportional relationship or adjustment of size should still fall within the scope disclosed in the present disclosure without affecting the effect and purpose of the present disclosure, and the technical contents must be within the scope of the present disclosure.

FIG. 1 is a schematic block diagram showing a hearing compensation device according to the present disclosure. As shown in FIG. 1, the hearing compensation device 100 includes a transducer 200, which receives external sound to convert the external sound into electrical signals; and a noise reduction module 300 and a hearing compensation module 400, which are connected to the transducer 200 to receive the electrical signals synchronously, wherein the noise reduction module 300 generates opposite signals with the same energy as the electrical signals to remove ambient noise. The hearing compensation module 400 obtains a real-time customized audiogram or a hearing table according to a user's current real environment, and multiple sets of parameters of multiple filters are automatically searched via noise cancellation technology combined with optimization method and loss function to generate an optimal filter parameter value, such that the noise reduction module 300 and the hearing compensation module 400 disposed in the same or single chip perform real-time and/or synchronous processing.

In one embodiment, the noise reduction module 300 is an active noise cancellation (ANC) module, and the noise cancellation technology is an active noise cancellation (ANC) technology.

In another embodiment, if the electrical signals are forward signals, the opposite signals thereof are reverse signals; alternatively, if the electrical signals are reverse signals, the opposite signals thereof are forward signals.

In addition, the above modules can be hardware or firmware; if they are hardware, they can be various circuits for noise reduction and hearing compensation, or hardware units with similar technologies; if they are firmware, they can be various firmware units that perform noise reduction and hearing compensation respectively. In one embodiment, the noise reduction module 300 is a noise reduction circuit or a noise reduction hardware/firmware unit, and the hearing compensation module 400 is a hearing compensation circuit or a hearing compensation hardware/firmware unit. It should be noted that the noise reduction module 300 includes but not limited to ANC.

The present disclosure mainly combines the optimization method and the cost function/loss function through the noise reduction (such as ANC) technology, which not only enables the hearing aids (such as auditory aids or earphones) to emit reverse waves (or forward waves) with the same energy as the current noise to cancel ambient noise in the ear canal (i.e., noise reduction), and can further directly perform hearing compensation (loudness compensation/enhancement/normalization/equalization) on the user's hearing threshold to amplify the signals of each frequency (such as forward signals and/or reverse signals). The present disclosure has the effect of providing real-time, customized user's hearing aids, hearing auditory aids or devices (such as earphones, smart glasses, wearable devices and other hearing devices) with hearing aid functions.

Noise Reduction Technology for Hearing Compensation Signal Structure

Figure 2:
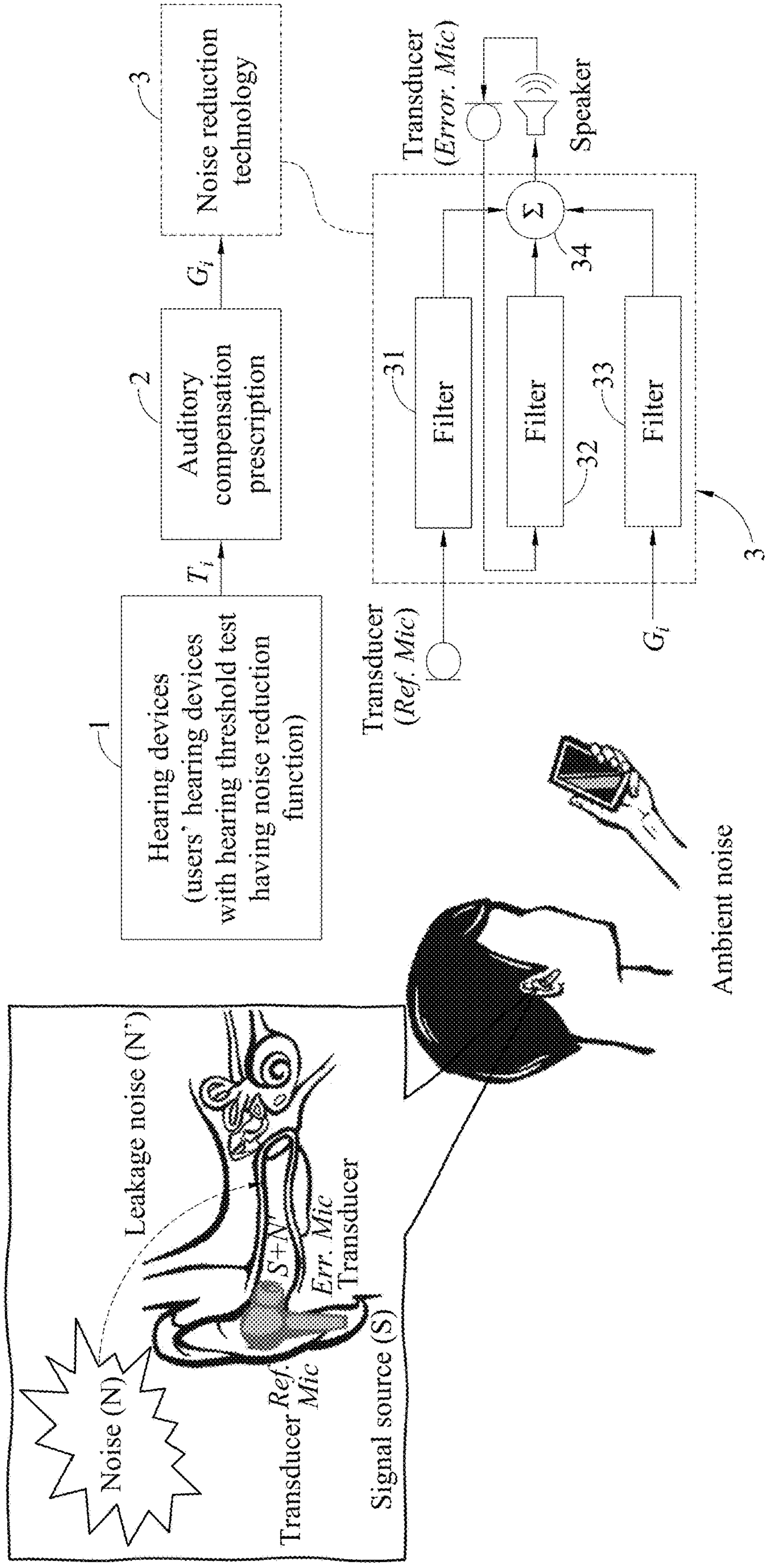
FIG. 2 is a schematic diagram showing the hearing compensation device according to an embodiment of the present disclosure.

FIG. 2 is a schematic diagram showing the hearing compensation device according to an embodiment of the present disclosure. As shown in FIG. 2, users use their own hearing devices 1 (various smart devices, such as an application program APP of a smart phone with a wireless [e.g., TWS] earphone) instead of using an earphone dedicated to the audiometric testing room to perform audiometry such that users are allowed to obtain hearing threshold (Ti) information in various current real environments or real application environments (i.e., quiet or noisy environments) instead of audiometric testing room, wherein i represents the measurement frequency. The measured Ti will be calculated and obtained through the auditory compensation prescription (prescription formula) 2 to obtain the compensation gain target curve Gi. The types of the auditory compensation prescription include hearing normalization (loudness normalization) and hearing equalization (loudness equalization), such as POGO, NAL-R, NAL-RP, DSL, DSL 5.0, POGO II, FIG. 6, NAL-NL1, NAL-NL2, IHAFF, LGOB, Aescu HRL-1, etc. with the same or similar types of compensation prescription. The present disclosure is not limited thereto.

In one embodiment, the noise reduction technology 3 adopts active noise cancellation (ANC) technology. For the convenience of description, the ANC technology is used as an example below, but in different embodiments, the same or similar noise reduction technologies are applicable, and the present disclosure is not limited thereto. In an embodiment, the parameters of filters 31, 32, 33 (such as FF, FB and SZ) can be determined through the information of "Mechanism Acoustics" and "Gi." That is, the filter parameters in the ANC technology will be determined by means of the mean-square error (MSE) method such that the ANC technology can perform the gain compensation capability of different frequencies for the sound source transmitted by the transducer. In one embodiment, the filters 31, 32, 33 may be a feedforward (FF) filter, a feedback (FB) filter, and an SZ filter, respectively, wherein the feedforward (FF) filter receives the electrical signal of the transducer (Ref. Mic) to eliminate external noise; the feedback (FB) filter receives the electrical signal of the transducer (Error. Mic) (that is, the transducer [Error. Mic] converts the noise in the ear into an electrical signal) to eliminate the noise in the ear; and the SZ filter receives the appropriate target curve (Gi) to amplify the signal of each frequency in the electrical signal (such as the signal source "S" in FIG. 2).

After the Gi is obtained, the parameters required by the ANC technology are searched through optimization techniques (for example, combining genetic algorithm techniques) or artificial intelligence techniques to approximate its target curve. In an embodiment, the Biquad filter structure is illustrated. The formula (1) shown below can be obtain form the Biquad filter structure. That is, the parameters "$b_0$, $b_1, \ldots, b_N, a_1, \ldots, a_M$" of the filters are calculated through the above optimization techniques (or artificial intelligence techniques).

$$H(z) = \frac{B(z)}{A(z)} = \frac{b_0 + b_1 z^{-1} + b_2 z^{-2} + \ldots + b_N z^{-N}}{1 + a_1 z^{-1} + a_2 z^{-2} + \ldots + a_M z^{-M}} \quad (1)$$

In an embodiment, outputs of the filters 31, 32, 33 are connected to an adder 34. Through the above method, the calculated parameter of the correlation filters 31, 32, 33 can be written into the hardware device such that the hearing compensation device of the present disclosure can not only overcome the problem of leakage noise (N') caused by environmental noise, but also perform auditory compensation processing on the signal source (S) obtained by the transducer, so as to solve the problems that could not be solved in the audiometric testing room in the past.

Figure 3:
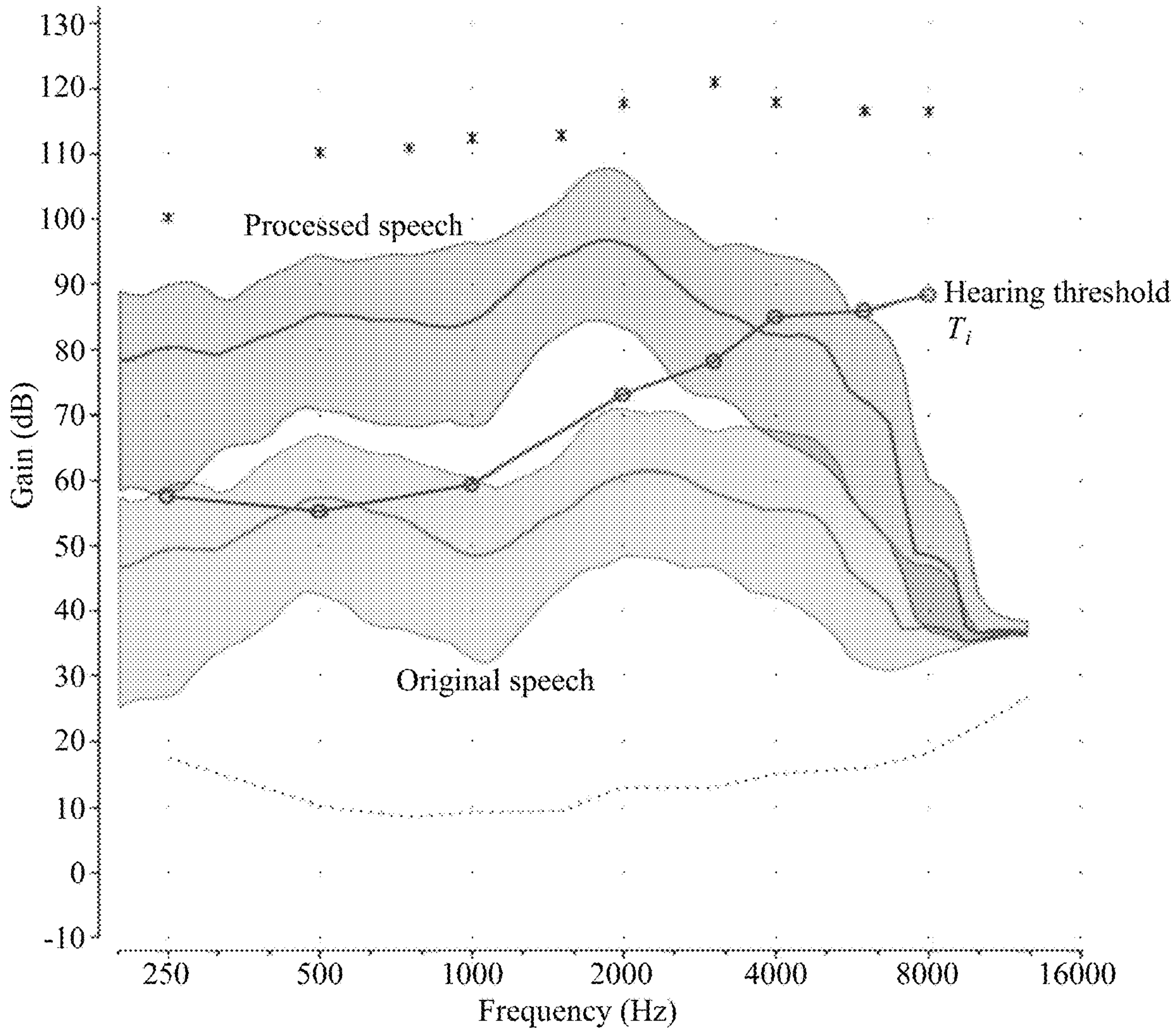
FIG. 3 is a schematic graph showing hearing compensation of the hearing compensation device according to an embodiment of the present disclosure.

FIG. 3 is a schematic graph showing hearing compensation of the hearing compensation device according to an embodiment of the present disclosure. As shown in FIG. 3, since the present disclosure uses the same or a single noise reduction circuit to process the original speech through customized auditory compensation, the speech is processed by the noise reduction technology (such as ANC) to reduce leakage noise and allow the processed speech to fall above the hearing threshold of the hearing-impaired person. It should be noted that each person's hearing threshold is different, and the present disclosure can be applied to the hearing thresholds of various users, thereby generating an auditory compensation effect that is not available in the past.

Optimization Technology Integrating Adaptive Function for Noise Reduction Technology Parameter Search How to quickly find the current environmental characteristics of different users (especially the hearing-impaired users) and provide an appropriate target curve (Gi) is one of the key factors for improving the benefit of the noise reduction system. In other words, it is important to determine the parameters of the filters in the noise reduction technology by considering both the hearing threshold (Ti) information and the leakage noise (N') characteristics of the hearing-impaired person.

Figure 4:
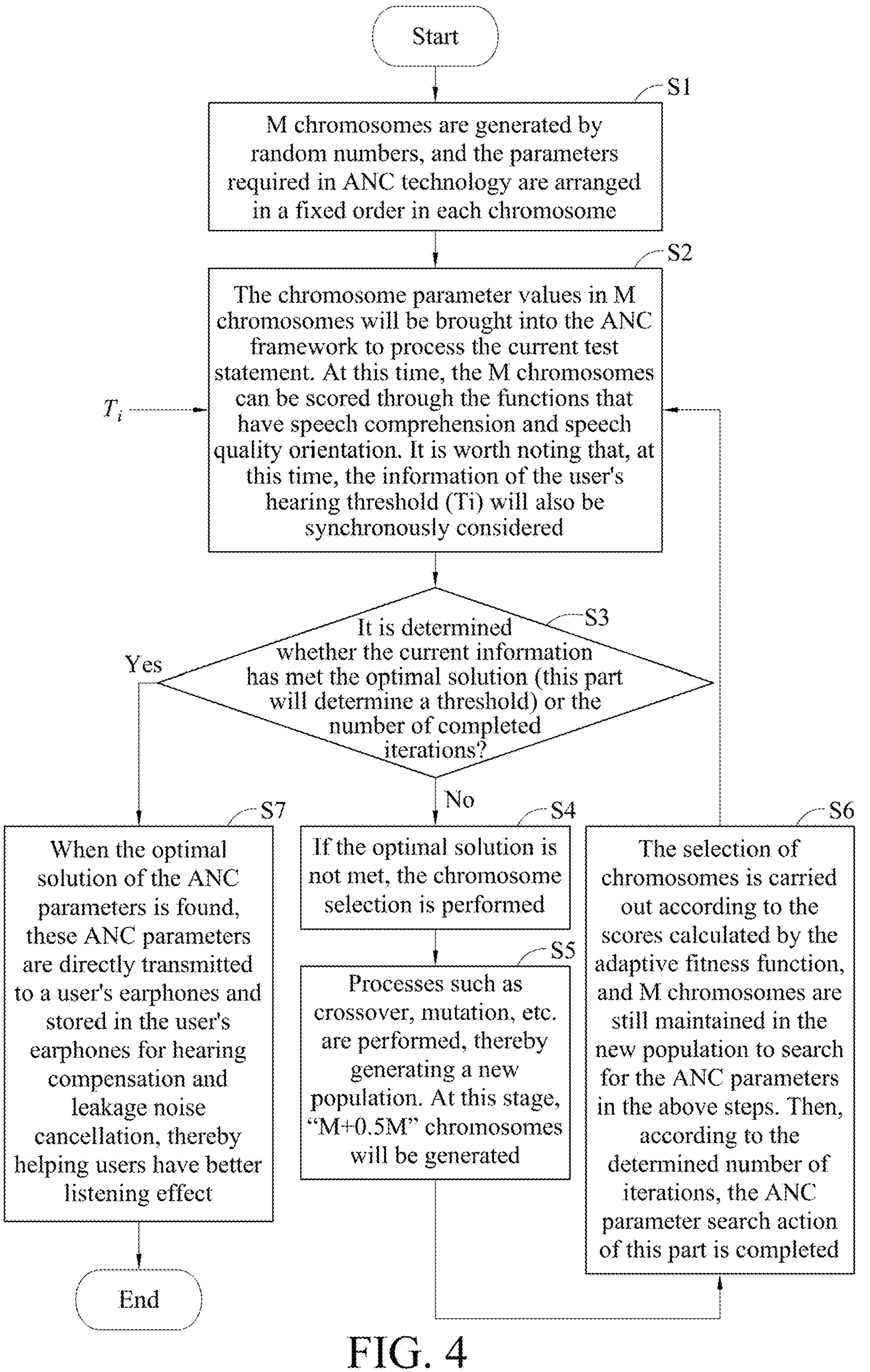
FIG. 4 is a flow chart showing the steps of searching for technical parameters of active noise cancellation (ANC) of the hearing compensation device according to the present disclosure.
Figure 5:
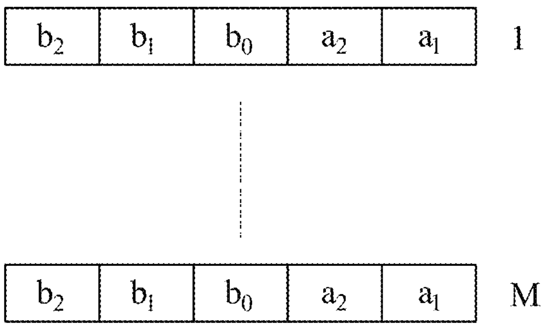
FIG. 5 is a schematic diagram showing the filter parameter arrangement of the hearing compensation device according to an embodiment of the present disclosure.

In one embodiment, FIG. 4 is a flow chart showing the steps of searching for technical parameters of active noise cancellation (ANC) of the hearing compensation device according to the present disclosure. FIG. 5 is a schematic diagram showing the filter parameter arrangement of the hearing compensation device according to an embodiment of the present disclosure. As shown in FIG. 4, the present disclosure uses optimization technology (e.g., technology combined with genetic algorithm) to cooperate with speech comprehension (STOI, SII, NCM, HASPI, ASR scores, etc.) or speech quality (PESQ, HASQI, SDR, etc.) oriented functions are used as fitness functions to quickly find suitable ANC technical parameters. Through the present disclosure, the characteristics of ambient noise and the hearing conditions of the user can be quickly evaluated to provide personalized noise reduction and auditory compensation benefits. Detailed steps are described as follows.

First, in step S1, M chromosomes are generated by random numbers, and the parameters required in ANC technology are arranged in a fixed order in each chromosome. The concept thereof is shown in FIG. 5

Subsequently, in step S2, the chromosome parameter values in M chromosomes will be brought into the ANC framework to process the current test statement. At this time, the M chromosomes can be scored through the functions (e.g., HASPI, HASQI) that have speech comprehension and speech quality orientation. It is worth noting that, at this time, the information of the user's hearing threshold (Ti) will also be synchronously considered.

After that, in step S3, it is determined whether the current information has met the optimal solution (this part will determine a threshold) or the number of completed iterations?

If the optimal solution is not met, proceed to step S4, and the subsequent chromosome selection is performed. After that, go to step S5, and perform processes such as crossover, mutation, etc., thereby generating a new population. For example, at this stage, "M+0.5M" chromosomes will be generated. Subsequently, in step S6, the selection of chromosomes is carried out according to the scores calculated by the adaptive fitness function, and M chromosomes are still maintained in the new population to search for the ANC parameters in the above steps. Then, according to the determined number of iterations, the ANC parameter search action of this part is completed.

On the contrary, when the above steps find the optimal solution of the ANC parameters, then proceed to step S7, and directly transmit these ANC parameters to a user's earphones (such as TWS earphones) and store these ANC parameters in the user's earphones for hearing compensation and leakage noise cancellation, thereby helping users have better listening effect.

It should be noted that $a_1$, $a_2$, $b_0$, $b_1$ and $b_2$ shown in FIG. 5 are the parameters of the formula (1), but merely for illustration, and the present disclosure is not limited thereto.

Hybrid ANC Technology

In addition, in the prior art, users can adjust the anti-noise level through buttons or environment perception. In a crowded environment with people and vehicles, users can quickly switch to the ambient sound mode to talk to people, or perceive the sound around the environment to reduce the noise reduction factor to improve safety. Active noise cancellation headphones are headphones that use the active noise control mechanism to cancel unpleasant sounds (i.e., noise) around them. Since human voices, car horns, etc. are all high-frequency, users will worry about not being able to hear others when using headphones. When crossing the road, it is also necessary to maintain a sensitive hearing for safety such that the most urgent need for most users is to block low-frequency noise. The principle thereof is to use the noise reduction system to generate sound waves opposite to the external noise to neutralize the noise, thereby achieving the effect of noise reduction.

If the ambient low-frequency noise (about 20 Hz to 200 Hz) that can be heard by the human ear is detected through the microphone in the earphone, and then the noise signal is sent to a control circuit such that the control circuit performs real-time calculations, and emits sound waves with the opposite phase and the same amplitude as the noise through the speaker, which can offset the noise. The noise reduction effect is achieved through a hardware mechanism, and the interior of the hardware consists of a pickup (responsible for listening and detecting external sounds that cannot be isolated by physical structures), a noise reduction processor (generating a reverse sound wave that is opposite to the noise, 180° opposite), and a speaker (the reverse sound wave produced by the noise reducer will be transmitted into the speakers of the earphones together with the normal music) to complete the noise reduction. However, due to the fact that the filter parameters currently used by ANC cannot be designed in consideration of hearing loss at the same time, the benefits between noise removal and compensation units cannot achieve the optimal performance. In other words, if the optimal parameters of noise cancellation and hearing compensation are considered at the same time, the hearing-impaired person can have better listening effect in real application scenarios.

Figure 6:
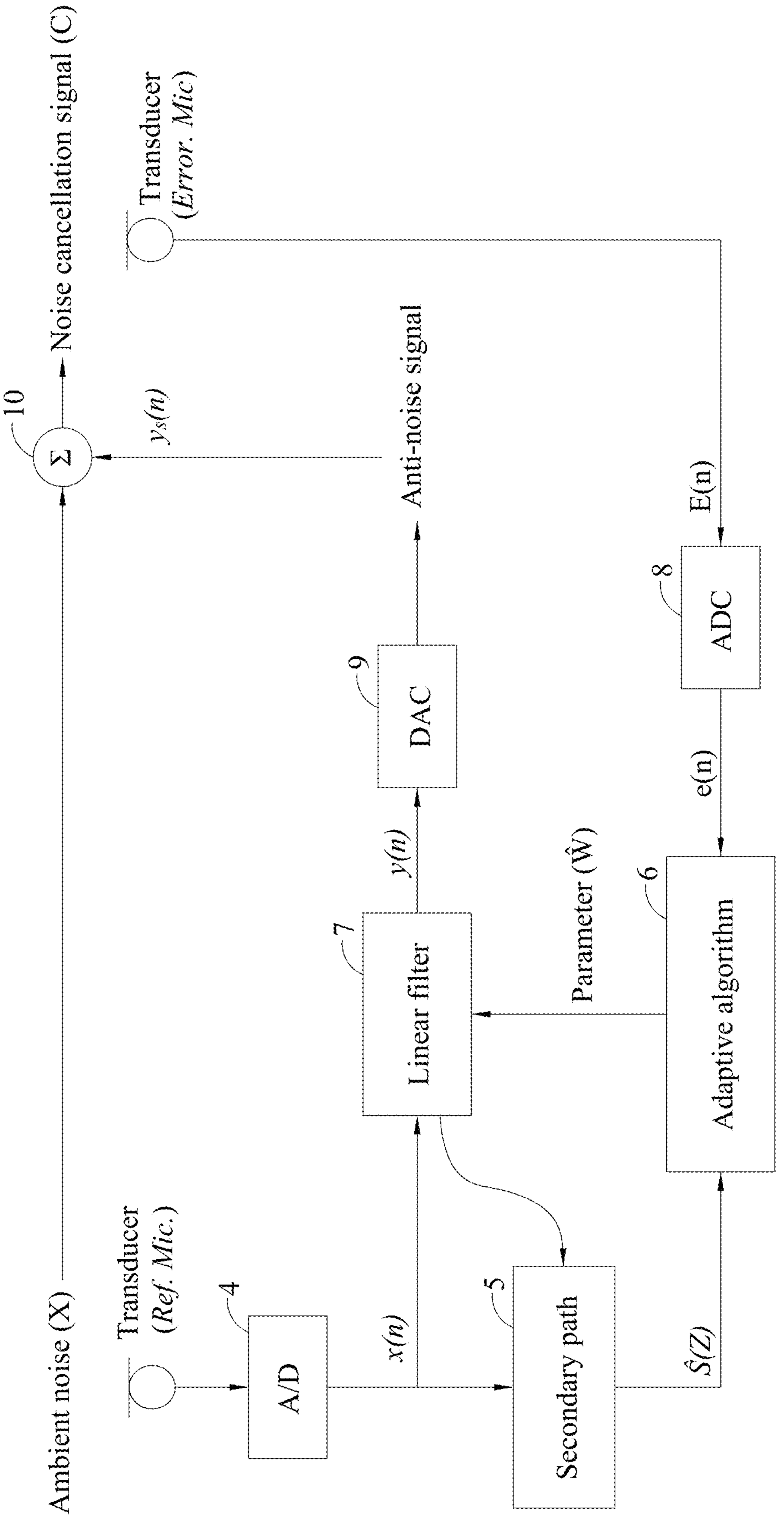
FIG. 6 is a schematic block diagram showing a hearing compensation device according to another embodiment of the present disclosure.

FIG. 6 is a schematic block diagram showing a hearing compensation device according to another embodiment of the present disclosure. In an embodiment, two transducers and one speaker are required. One (Ref. Mic.) of the two transducers is close to the noise source, and another transducer (Error Mic.) is placed in the sound field that needs anti-noise to continuously receive its error values. When a signal is received by a transducer (Ref. Mic.), it is first converted into a digital signal by an analog-to-digital converter (A/D) 4, and then sent to the impulse response unit of the secondary path 5 for calculation to obtain $\hat{S}(z)$. The calculated $\hat{S}(z)$ value is subsequently sent to an adaptive algorithm 6 for parameter estimation of a linear filter 7 and a digital-to-analog converter (DAC) 9. The present disclosure takes the LSM algorithm as an example. The LSM algorithm mainly defines the cost function through the Error Mic. and the e(n) measured by the analog-to-digital converter (ADC) 8. The formula (2) is shown as follows:

$$\xi(n)=e^2(n) \quad (2)$$

Finally, according to the gradient descent method, the above formula is minimized to achieve the purpose of convergence. The obtained formula (algorithm) (3) is expressed as follows:

$$\hat{w}(n+1)=\hat{w}(n)+\mu\hat{S}(z)e(n) \quad (3)$$

wherein μ is the step size for updating weights, and $\hat{S}(z)$ is the factor that includes the feedback component and affects the convergence of the controller weights. In an embodiment, the present disclosure will continuously update the estimated weight $\hat{w}$ based on the characteristics of the input signal (Ref. Mic.) so as to enable the system to generate the correct anti-noise signal $y_s(n)$, and combine the ambient noise X and the anti-noise signal $y_s(n)$ via an adder 10, thereby achieving no noise signal in a specific space.

According to the above embodiments, the hearing compensation device of the present disclosure includes a transducer, a noise reduction module and a hearing compensation module, wherein the transducer receives external sound to convert the external sound into electrical signals.

In addition, the noise reduction module is connected to the transducer to receive electrical signals form the transducer, and the hearing compensation module is also connected to the transducer to simultaneously receive electrical signals from the transducer, wherein the noise reduction module and the hearing compensation module are processed in real time and synchronously in the same or single chip. Moreover, ANC technology uses hardware circuits and/or firmware to perform signal processing in the same or single chip, thereby greatly reducing computational latency. In other words, since the noise reduction module and the hearing compensation module of the present disclosure perform real-time and synchronous processing in the same or single chip, the present disclosure can effectively solve the problem of signal delay in conventional auditory aids or hearing aids.

Further, the noise reduction module has active noise reduction technology or similar technology.

In one embodiment, the noise reduction module generates an opposite signal with the same energy as the electrical signals to remove ambient noise. At the same time, the hearing compensation module is based on the real-time customized audiogram or a hearing table obtained by the user (especially the hearing-impaired patient) in the current real environment. Multiple sets of parameters of the multiple filters are automatically searched by the noise reduction technology combined with the optimization method and the loss function to generate an optimal filter parameter value such that the noise reduction module and the hearing compensation module disposed in the same or single chip perform real-time and synchronous processing. Accordingly, the signals of various frequencies in the electrical signals (such as forward signals and/or reverse signals) are amplified such that the hearing compensation effect of simultaneous anti-noise and compensation can be achieved for different users (especially hearing-impaired patients) and close to their lifestyles.

Since the present disclosure is applicable to various smart devices, the hearing compensation device can perform audiometry in a non-audiometric testing room environment (e.g., a living room, outdoor, inside a car, a park, etc.). That is to say, the hearing compensation device of the present disclosure does not need to be limited to an audiometric testing room to perform audiometry. The present disclosure can provide real-time, customized user's hearing aids, auditory aids or devices with hearing aid functions in the current real environment of the non-audiometric testing room.

In one embodiment, the hearing compensation device of the present disclosure is disposed in hearing aids, such as earphones (including but not limited to moving-coil, electret, planar magnetic, balanced armature, electrostatic, wired and wireless earphones), auditory aids, noise-cancelling headphones, monitoring headphones, smart glasses, wearable devices, or a combination thereof. In another embodiment, the hearing aid of the present disclosure is also a hearing device, having the above-mentioned hearing compensation device, wherein the hearing compensation device is arranged and connected to the hearing device.

Besides, the hearing compensation device of the present disclosure can be combined with an application program (app) of a smart phone and a wireless communication technology (e.g., Bluetooth, Wi-Fi, near-field communication [NFC], ultra-wideband [UWB], IEEE 802.15.4 and other wireless communication technologies), directly synchronize the real-time customized audiogram or hearing table of users (especially hearing-impaired patients) with the noise reduction module and the hearing compensation module disposed in the same or single chip to operate, and provide users (especially hearing-impaired patients) with instant comfortable listening experience.

It is worth mentioning that the hearing compensation device of the present disclosure does not need to be limited to an audiometric testing room for performing audiometry, and the present disclosure also does not require the assistance of hearing professionals, and can instantly customize own devices (e.g., hearing aids, auditory aids, or earphones with hearing aid functions, etc.) by means of smart phones and wireless communication technology.

Figure 7:
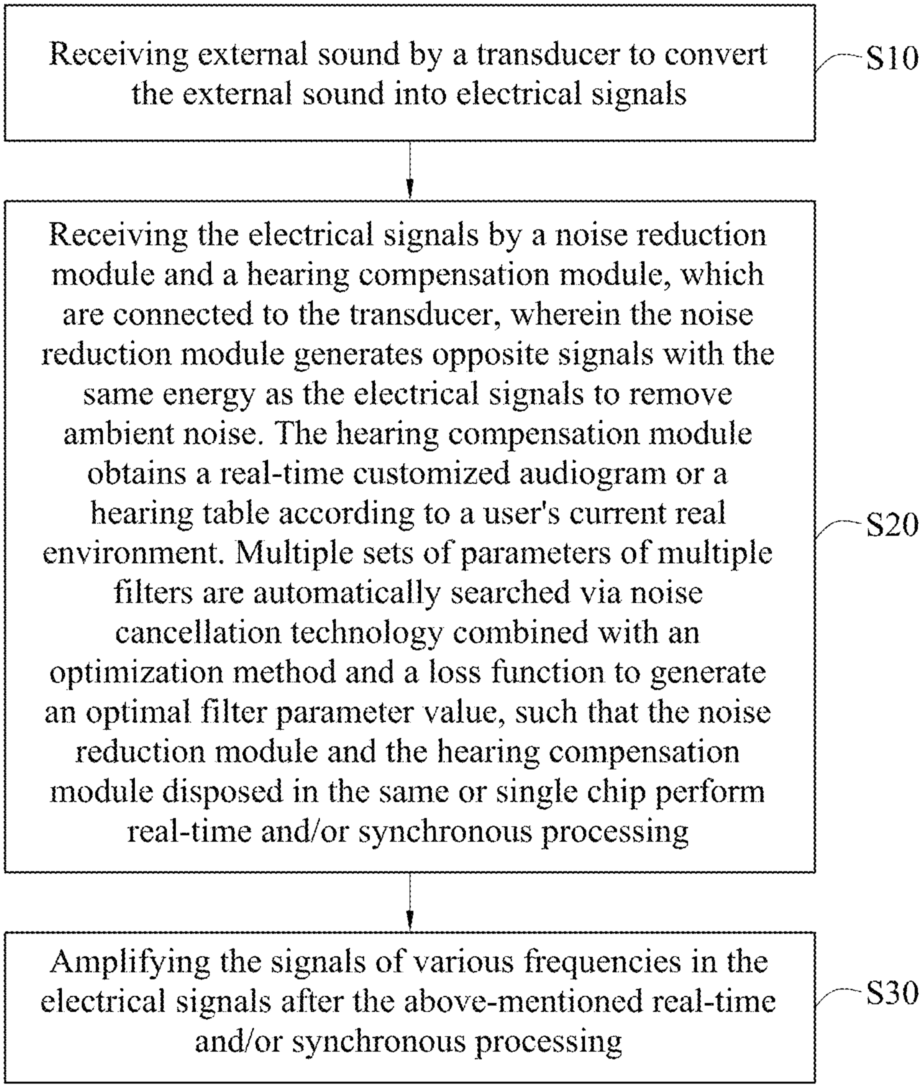
FIG. 7 is a flow chart showing the steps of the hearing compensation method according to the present disclosure.

FIG. 7 is a flow chart showing the steps of the hearing compensation method according to the present disclosure, which is combined with the description of the above-mentioned embodiments. The method includes the following steps S10 to S30.

In step S10, external sound is received by a transducer, and the external sound is converted into electrical signals.

In step S20, the electrical signals are received by a noise reduction module and a hearing compensation module, which are connected to the transducer. The noise reduction module generates opposite signals with the same energy as the electrical signals to remove ambient noise. The hearing compensation module obtains a real-time customized audiogram or a hearing table according to a user's (especially hearing-impaired patient's) current real environment. Multiple sets of parameters of multiple filters are automatically searched via noise cancellation technology combined with an optimization method and a loss function to generate an optimal filter parameter value, such that the noise reduction module and the hearing compensation module disposed in the same or single chip perform real-time and/or synchronous processing.

In one embodiment, the user has to turn on the noise reduction function and/or the hearing compensation function of his/her own hearing device (e.g., various smart devices), such that the above-mentioned modules can perform the aforesaid steps to realize real-time and/or synchronous processing.

In step S30, after the above-mentioned real-time and/or synchronous processing, the signals (forward signals and/or reverse signals) of various frequencies in the electrical signals are amplified.

To sum up, the hearing compensation device and the hearing compensation method of the present disclosure use the noise reduction technology combined with the loss function to enable the earphone to emit a reverse wave (or a forward wave) with the same energy as the current noise to cancel ambient noise in the ear canal. In addition, the hearing compensation module can also directly perform hearing compensation on the real-time customized audiogram or the hearing table of the user (especially the hearing-impaired patient) such that the signals of various frequencies (such as forward signals and/or reverse signals) can be amplified. As such, the present disclosure has the effect of instant and customized hearing aids, auditory aids or earphones with hearing aid functions for hearing-impaired patients.

Further, the hearing compensation of the present disclosure automatically determines the parameters of multiple filters according to an optimization method combined with a loss function so as to generate a new target curve suitable for the hearing-impaired patient (that is, signals [e.g., forward signals and/or reverse signals] of various frequencies are amplified), thereby achieving the hearing compensation effect of simultaneous anti-noise and compensation for different hearing-impaired patients and close to their lifestyles.

The above-mentioned embodiments are illustrative of the principles and effects of the present disclosure, and are not intended to limit the present disclosure. Persons skilled in the art can modify and change the above-mentioned embodiments without departing from the spirit and scope of the present disclosure. Therefore, the protection scope of the present disclosure should be listed in the scope of the patent application.

What is claimed is:

1. A hearing compensation device, comprising:

a transducer configured to receive sound to convert the sound into electrical signals; and an active noise reduction module and a hearing compensation module connected to the transducer to receive the electrical signals synchronously, wherein a user is required to turn on an active noise reduction function and/or a hearing compensation function of his/her own hearing device, the active noise reduction module generates opposite signals with a same energy as ambient noises of the electrical signals, such that forward signals of the ambient noises of the electrical signals cancel out the opposite signals, thereby removing the ambient noises, wherein when the user conducts his/her own hearing test in a current real environment, a real-time customized audiogram or a hearing table is obtained, the hearing compensation module receives the real-time customized audiogram or a hearing table according to the user's current real environment, and multiple sets of parameters of multiple filters are automatically searched via filters of active noise cancellation technology combined with optimization method and loss function to generate an optimal filter parameter value suitable for the user's signal amplification at various frequencies, such that the active noise reduction module and the hearing compensation module disposed in a same or single chip perform real-time and/or synchronous processing.

2. The hearing compensation device according to claim 1, wherein the electrical signals have signals of various frequencies, and wherein the signals of the various frequencies in the electrical signals are amplified after the real-time and/or synchronous processing by the active noise reduction module and the hearing compensation module.

3. The hearing compensation device according to claim 1, wherein the active noise reduction module is an active noise cancellation module.

4. The hearing compensation device according to claim 1, wherein the hearing compensation device is disposed in a hearing aid.

5. The hearing compensation device according to claim 1, wherein the hearing compensation device performs real-time and/or synchronous processing via an application program of a smart phone combined with a wireless communication technology.

6. A hearing compensation method, comprising:

receiving sound by a transducer to convert the sound into electrical signals; and receiving the electrical signals by an active noise reduction module and a hearing compensation module connected to the transducer, wherein a user is required to turn on an active noise reduction function and/or a hearing compensation function of his/her own hearing device, the active noise reduction module generates opposite signals with a same energy as ambient noises of the electrical signals, such that forward signals of the ambient noises of the electrical signals cancel out the opposite signals, thereby removing the ambient noises, wherein when the user conducts his/her own hearing test in a current real environment, a real-time customized audiogram or a hearing table is obtained, the hearing compensation module receives the real-time customized audiogram or a hearing table according to the user's current real environment, and multiple sets of parameters of multiple filters are automatically searched via filters of active noise cancellation technology combined with optimization method and loss function to generate an optimal filter parameter value suitable for the user's signal amplification at various frequencies, such that the active noise reduction module and the hearing compensation module disposed in a same or single chip perform real-time and/or synchronous processing.

7. The hearing compensation method according to claim 6, further comprising: amplifying the signals of the various frequencies in the electrical signals after the real-time and/or synchronous processing.

8. The hearing compensation method according to claim 6, wherein the active noise reduction module is an active noise cancellation module.

9. The hearing compensation method according to claim 6, wherein the hearing compensation method is applied to a hearing aid.

10. The hearing compensation method according to claim 6, wherein the hearing compensation method is processed in real-time and/or synchronously via an application program of a smart phone combined with a wireless communication technology.

11. The hearing compensation method according to claim 6, wherein the hearing compensation method is to perform audiometry in a non-audiometric testing room environment.

* * * * *